Figure 1:
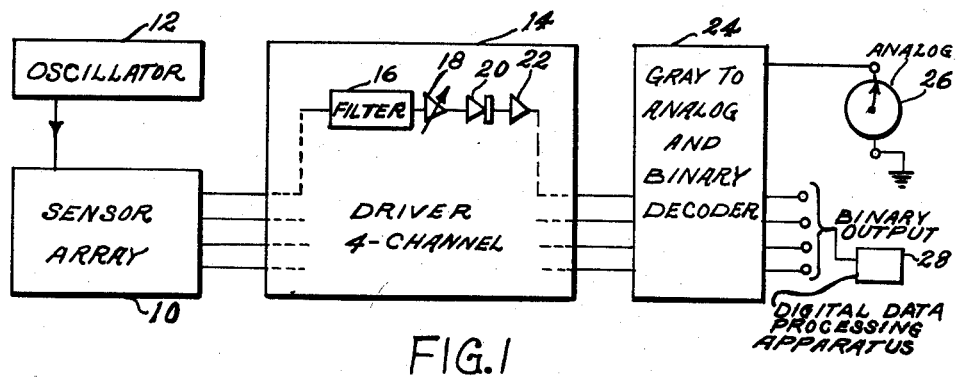

Nov. 17, 1964 S. B. WILLIAMS 3,157,048
DIGITAL TANK GAGING SYSTEM
Filed July 3, 1961 2 Sheets-Sheet 1

INVENTOR.
SIDNEY B. WILLIAMS
BY
Blair & Buckles
ATTORNEYS

United States Patent Office 3,157,048
Patented Nov. 17, 1964

3,157,048
DIGITAL TANK GAGING SYSTEM
Sidney B. Williams, Lexington, Mass., assignor to Trans-Sonics, Inc., Lexington, Mass.
Filed July 3, 1961, Ser. No. 121,537
20 Claims. (Cl. 73—304)

This invention relates to a novel system that measures the depth of a liquid by means of a logically ordered array of digital sensors. Each sensor ascertains the presence of the liquid at its level by detecting with an output coil an electric current, induced in the liquid or in a thermally sensitive conductor and passing through the coil. The output voltages of the immersed sensors are combined to provide analog and binary signals indicating the depth of the liquid.

Perhaps the best known prior system for liquid-depth measurement uses floats which ride up and down with the surface of the liquid. The mechanisms coupling the floats to the position-detector become increasingly bulky as the range of depth increases. In addition, since these systems require moving parts, lubrication problems are encountered, and debris in the liquid tends to bind and jam the moving parts.

Another prior system measures liquid-depth with vibrating transducers acoustically coupled to the liquid. Damping of a transducer indicates that the surface of the liquid is even with or above the transducer. These units are often unsatisfactory, since a film of liquid remaining on a transducer after the liquid recedes may damp its vibration as effectively as when the transducer is immersed. Systems in which the depth of an electrically conducting liquid affects the capacitance between a pair of conductors suffer from a similar problem. A film of liquid remaining on the capacitor after the level has dropped causes a significant error in measurement.

Accordingly, a principal object of this invention is to provide an improved instrument for measuring the depth of a liquid.

Another object is to provide a liquid-depth measuring instrument that is more reliable than prior devices of this type. More particularly, it is an object of the invention to provide an instrument that is less affected by contamination than prior systems. Thus, a corollary object is to provide an instrument of the above type that has no moving parts.

Still another object of the invention is to provide an instrument of the above type that is highly accurate.

A further object of the invention is to provide a liquid-depth measuring instrument that requires minimum maintenance and is therefore suitable for use in inaccessible locations.

Other objects of the invention will in part be obvious and will in part appear hereinafter.

The invention accordingly comprises the features of construction, combination of elements and arrangement of parts which will be exemplified in the construction hereinafter set forth and the scope of the invention will be indicated in the claims.

Figures 3, 6:
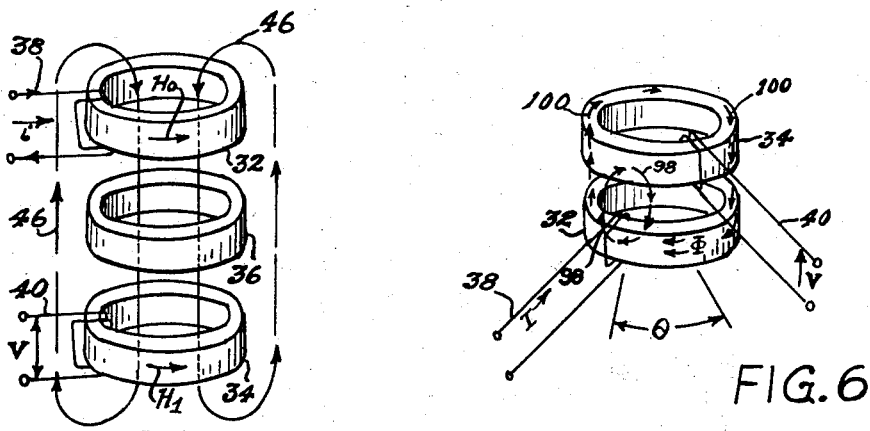
Figure 2:
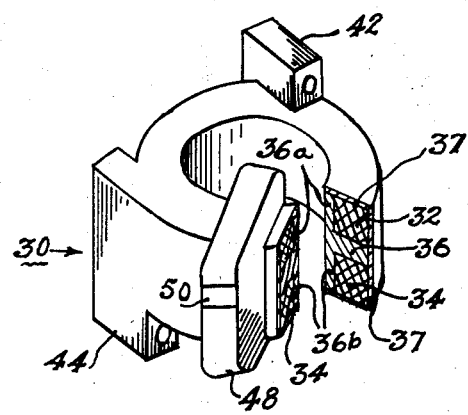
Figure 5:
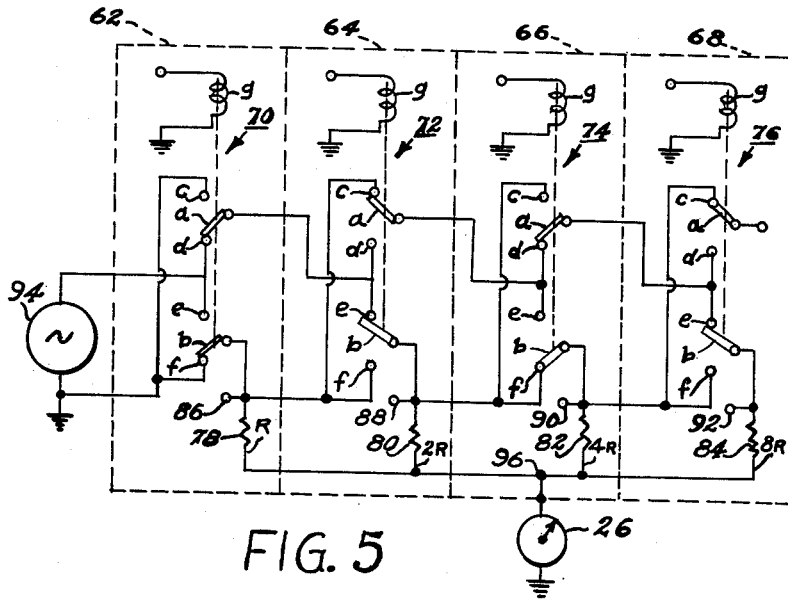
Figure 4:
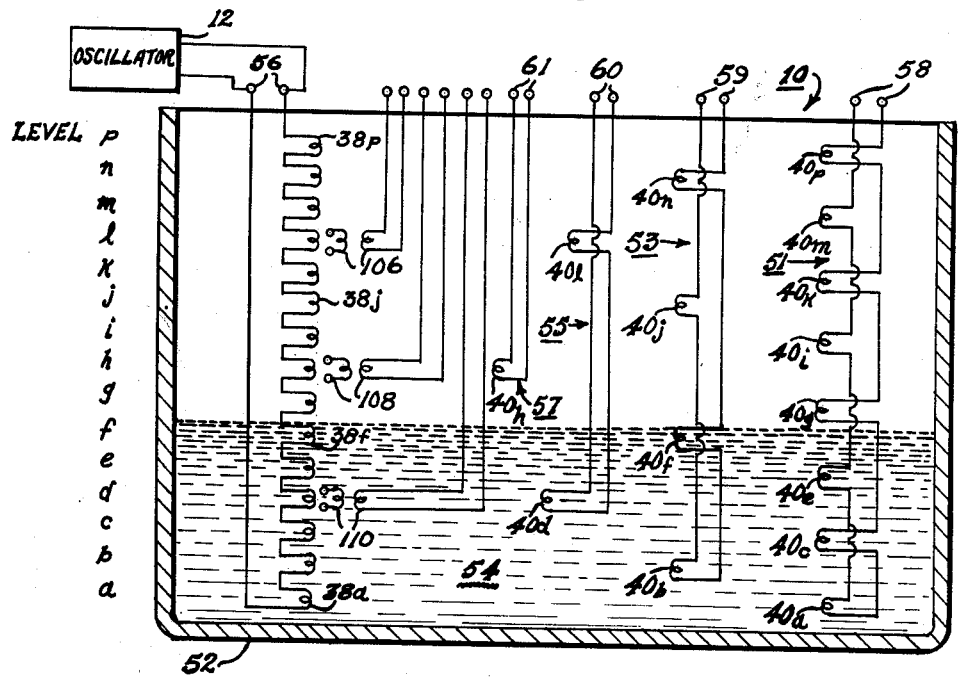

For a fuller understanding of the nature and objects of the invention, reference should be had to the following detailed description taken in connection with the accompanying drawings, in which:

FIG. 1 is a schematic diagram, in block form, of a liquid-depth measuring instrument embodying the present invention, FIG. 2 is a perspective view, partly cut away, of a sensor used in the instrument of FIG. 1, FIG. 3 is a schematic perspective view, in exploded form, of the sensor of FIG. 2, FIG. 4 is a detailed schematic representation of an array of sensors used in the instrument of FIG. 1, FIG. 5 is a detailed schematic representation of a decoder used in the instrument of FIG. 1, and FIG. 6 is a simplified perspective view of the sensor of FIG. 2 illustrating two components of leakage flux.

In general, the depth-measuring instrument includes an array of sensors, preferably stacked so that they become immersed one at a time as the liquid level rises. The array develops a digital signal indicative of the number of sensors that are immersed.

Each sensor preferably includes a primary and a secondary winding threaded on separate magnetic cores. When the sensor is immersed in an electrically conducting liquid, a magnetic field, developed in the primary core by alternating current in the primary winding, induces in the liquid a loop of coupling current that threads both cores. The coupling current develops in the secondary core a magnetic field which induces an output voltage across the secondary winding. When the sensor is above the level of the liquid, there is no path for the coupling current, and, consequently, no output voltage is developed.

The sensors may be physically disposed in a single column, although schematically they are connected in separate stacks, with each stack developing a digit of the output signal. For increased resolution, a spiral arrangement may be used, with adjacent sensors overlapping in the vertical direction. They are uniformly excited with an alternating current applied to their primary windings, and the secondary windings in each stack are successively connected in series in such manner that the output voltages in each pair of sensors buck or oppose each other. Accordingly, a Zero or "no signal" is developed by a stack of sensors when an even number thereof are immersed, and, similarly, a predetermined voltage corresponding to the digit One results when an odd number are immersed.

Preferably, the sensors are arranged according to the Gray code or some other binary code in which only a single digit changes in going from each value to the next higher or lower value. More specifically, as the liquid level rises and additional sensors are immersed, successive sensors covered by the liquid are in different series-connected stacks. Thus, the output voltage of any given stack is never varied twice before there is a change in the output of at least one other stack.

Successive values in the Gray or reflected binary code differ in only one digit, whereas this is generally not the case in the conventional binary system. For example, in going from the decimal number 7 to 8, 0111 and 1000, respectively, in standard binary rotation, all four digits change. On the other hand, these numbers are 0100 and 1100, respectively, in the Gray code, the only difference being in the first digit. As applied to the system described herein, this corresponds to a liquid level just above or below a single sensor in the stack representing the most significant digit. Thus, a small ambiguity in liquid level can result in an error no greater than the ultimate resolution of the system, i.e., in the least significant digit. The Gray system provides this advantage with a materially smaller number of sensors than other logical arrangements having the same resolution.

The digital signal from the array may be decoded to provide an analog signal for displaying the liquid depth with a meter or other indicator, or a standard binary signal for use with digital data handling equipment.

For use in non-conductive liquids, each sensor may be provided with a temperature sensitive conductor loop that threads both cores. Coupling current induced in this conductor heats it. When immersed in the liquid, the conductor is cooled, altering its resistance and changing the coupling current. Accordingly, the field in the secondary core is varied, with a similar effect on the output voltage across the secondary winding.

More specifically, as shown in FIG. 1, the instrument includes an array 10 of digital sensors located at successive levels and exposed to a liquid whose depth is to be monitored. The sensors are excited by an oscillator 12, and, in the illustrated unit, the array develops a four-digit Gray code output signal indicating the number of levels covered by the liquid. The alternating-current digital signal from the array 10 is fed to a four-channel driver 14, each channel of which includes a filter 16, an amplifier 18, a rectifier 20 and a second or output amplifier 22. The output amplifiers preferably operate only when the signal inputs thereto exceed a certain threshold level, so that the output voltages from the driver have definitely delimited discrete values. The output from the driver 14 is still a four-place Gray code signal, but with each place represented by a two-valued direct voltage.

The signals from the driver 14 are converted in a decoder 24 to both an analog signal and a standard binary signal. An analog indicator 26, such as a meter calibrated in terms of depth, receives the analog signal, while the four-bit binary signal may be delivered to digital data processing apparatus indicated at 28.

Referring to FIG. 2 and the exploded view of FIG. 3, a sensor, indicated generally at 30, as used in the array 10, has a toroidal driving core 32 and a pick-up core 34, axially separated by a spacer 36. The spacer 36, which is an electric insulator, has annular inner rims 36a and 36b (FIG. 2) that align the cores 32 and 34. The cores 32 and 34 and spacer 36 are preferably assembled and coated with a film 37 of epoxy resin, to prevent corrosion by the monitored liquid, before a primary winding 38 (FIG. 3) is toroidally formed on the driving core 32 and a second winding 40 is similarly fabricated on the core 34. Mounting lugs 42 and 44 may be conveniently formed integrally with the film 37.

The driving core 32 is preferably made of a magnetic material having a high saturation level, and the pick-up core 34 is of a material having a high initial permeability. Thus, the sensor can usefully accept a large excitation amplitude in winding 38. The high initial permeability of the core 34 maximizes the flux passing through it, to optimize the voltage induced in the secondary winding 40 in the manner described below.

The operation of the sensor 30 may be considered with reference to FIG. 3 by assuming it is immersed in a conductive liquid such as salt water. An alternating current, applied to the primary winding 38, generates a circular magnetic field $H_0$ in the driving core 32. The field induces in the fluid a coupling current, indicated by the arrows 46, that is constrained by the dielectric spacer 36 to thread both cores. An alternating magnetic field $H_1$, developed in the pick-up core 34 by the coupling current, induces an output voltage across the primary winding 40.

Until the sensor 30 is sufficiently immersed to provide a liquid-conducting loop through the cores 32 and 34, there is substantially no output from the winding 40. In a large tank, the resistance of the liquid conducting path is almost entirely in the portion thereof enclosed by the sensor 30. For this reason, the sensors should be oriented with their axes in the vertical direction. Thus, before the conducting path is completed by a rising liquid level, the interior of the sensor will be filled, and the resistance of the path will not vary as the level rises further. Therefore, the output voltage of the sensor will be at its full value essentially as soon as it appears. This will not be the case if the sensor axes are non-vertical, and the continuously varying output voltages of the sensors at the liquid level may then create problems in quantizing the depth of the liquid.

The sensors are operable over a wide range of excitation frequencies; for example, frequencies from 60 to 100,000 c.p.s. are readily usable.

For use in non-conductive liquids, each sensor 30 is provided with a coupling loop 48 (FIG. 2) threading both cores. The loop 48 is of a material having a large, preferably positive, coefficient of temperature resistance. Thus, the resistance of the loop preferably decreases as its temperature decreases.

Current induced in the loop 48 by excitation of the primary winding 38 heats the loop above the temperature of the monitored liquid. When the loop is immersed in the liquid, heat is conducted away from it at a greater rate than when it is exposed only to the atmosphere. Therefore, it is cooler and its resistance is lower. The current in the coupling loop 48 is therefore greater, with a larger output voltage across the secondary winding 40 when the loop is immersed.

With a coupling loop 48 having a positive temperature coefficient of resistance, the effects of the liquid cooling the loop 48 and marginal conduction through a high resistance liquid both increase the coupling between the driving and the pick-up cores, i.e., the two effects reinforce each other. The temperature sensitive portion of the loop 48 is preferably limited to a small portion 50, which may, for example, be a conventional thermistor. This tends to sharpen the change in output voltage as the liquid level passes the portion 50.

The schematic arrangement of the array 10 of sensors 30 is shown in detail in FIG. 4. As illustrated therein, the sensors are disposed in a tank 52 containing a liquid indicated at 54. The levels at which the depth of the liquid is to be measured are indicated by the letters $a$–$p$. The two windings of each sensor, which are graphically separated for clarity, are identified by the same letter following the reference numerals used therewith. Thus, primary winding 38a and secondary winding 40a are in the "$a$-level" sensor. The primary windings 38 are connected in series, with the same winding sense, between a pair of excitation terminals 56.

The sensors 30 of the array are ordered in the respective levels according to the Gray code, with one sensor at each level. They are electrically arranged in stacks, indicated generally at 51, 53, 55 and 57, with each stack developing the digits in one position or place of the output signal from the array. The secondary windings 40 in the respective stacks are connected in series between output terminals 58, 59, 60 and 61. The secondary windings in each pair of adjacent sensors are connected in the opposite direction, so that the output voltages developed thereon have opposite polarity. Furthermore, the two voltages in each pair are equal in magnitude and thus they cancel each other.

To illustrate, the windings 40a and 40c in the stack 51 are connected so that their output voltages cancel. The windings 40e and 40g are similarly connected. However, there is no need for cancellation between windings in the pair 40a–40c and the ones in the pair 40e–40g. Thus, in accordance with the terminology used herein, each winding belongs to no more than one pair.

Still referring to FIG. 4, the oscillator 12 is connected to the terminals 56 and thus excites the primary windings 38 with alternating current at a suitable frequency. Assume that the liquid 54 is conductive, e.g., salt water, and that the sensors do not include the coupling loop 48. (FIG. 2). As the depth of the liquid 54 rises to successive levels, additional sensors are immersed and develop output voltages across their secondary windings 40. When an even number of sensors in a stack, i.e., an integral number of pairs, are immersed, each output voltage is cancelled by another output voltage, and the net voltage across the output terminals of that stack is substantially zero. When an odd number of sensors in a stack are immersed, the secondary voltages of all but one of them are cancelled, and hence a finite voltage is developed at the output terminals.

Consider, for example, that the liquid 54 (FIG. 4) is at a depth between the $f$ and $g$ levels, so that six sensors are immersed. In the stack 51, the $a$, $c$ and $e$ sensors are immersed. The voltage developed across the output windings 40a and 40c are of equal and opposite polarity and substantially cancel, while the voltages developed in the windings above 40e in this stack are all zero; therefore the voltage across the winding 40e appears across the terminals 58. Thus, the least significant digit of the Gray-coded signal output from the array is a One.

In the stack 53, the b and f sensor output windings 40b and 40f are immersed, and, accordingly, the second digit of the output signal is a Zero, signified by the absence of a voltage at the terminals 59. In the stack 55, the immersed sensor (winding 40d) develops a voltage at the terminals 60 signifying a One for the third digit. No sensors of the stack 61 are immersed, and, thus, the digital signal from the array is 0101, which is the Gray code number for 6. This correctly indicates that the liquid immerses six sensor levels, but not the seventh.

The fundamental frequency component of the voltage developed in the secondary windings 40 substantially cancel, in the manner described above, by virtue of the interconnections among the windings. However, harmonic components developed in the sensors may not always cancel sufficiently. These components are eliminated by the filters 16 (FIG. 1), which may be tuned to the frequency of the oscillator 12.

The decoder 24, shown in detail in FIG. 5, has four stages—62, 64, 66 and 68, one for each digit position of the array 10 (FIG. 4). The respective stages comprise double-pole, double-throw relays, generally indicated at 70, 72, 74 and 76 and resistors 78, 80, 82 and 84. The decoder develops a binary coded signal at terminals 86, 88, 90 and 92 in the form of voltages across the resistors 78–84. An analog signal is obtained by summing the current through the resistors with the analog indicator 26, in this case a conventional ammeter.

Translation of a digit in the Gray code to the corresponding ordinary binary digit requires knowledge of the corresponding Gray digit and the next more significant binary digit. Thus, in terms of a logical sequence, the decoder 24 starts decoding the Gray signal with the most significant digit in the stage 62 and proceeds, in order, to the least significant digit, connected in stage 68. More particularly, the relays 70–76 are interconnected to develop a One in each position if the corresponding Gray digit and the next more significant binary digit are the same; if they are different, a Zero is developed.

Each relay has a pair of ganged transfer contacts a and b and two pairs of fixed contacts c and d, and e and f, positioned for engagement with the transfer contacts. The relay coils g are actuated by the signals from the respective stacks of sensors, after the signals are operated upon by the driver 14. More particularly, the coils are energized only when the signals fed to them correspond to the Gray digit Ones. The relay 70 has a voltage source 94 connected between its fixed contacts 70d and 70c and also between contacts 70c and 70f. The relays 72, 74 and 76 have their "d" and "e" contacts connected to the "a" transfer contacts of the relays of the preceding stages. In addition, the "c" and "f" contacts of each stage are connected to the second "b" contact of the preceding stage.

The resistors 78, 80, 82 and 84 are connected between the respective "b" contacts and a common terminal 96, from which the indicator 26 is connected to the source 94 by way of a ground return. The resistor values are properly weighted according to the binary code, as indicated in FIG. 5, i.e., the resistor 78 has one unit of resistance, the resistor 80 has one-half unit, the resistor 82 has one-quarter unit and the resistor 84 one-eighth unit.

Operation of the decoder of FIG. 5 will now be considered with the liquid depth at the sixth level, as in FIG. 4. As noted above, the array 10 develops a Gray code output signal of 0101 under this condition. Starting in stage 62 with the highest Gray digit, a Zero, the coil 70g is not energized and, accordingly, the voltage from source 94 is transferred to the fixed contacts 72d and 72e of the succeeding stage 64, corresponding to the next lower digit position. In addition, the resistor 78 is connected to ground via contact 70b and, accordingly, a binary Zero is developed at the terminal 86.

Since the next Gray digit is a One, coil 72g is energized, and the transfer contacts 72a and 72b engage contacts 72c and 72e, respectively. Accordingly, the voltage from the source 94, present at the contact 72e, reaches contacts 74f and 74c by way of contact 72b and thus is applied across the resistor 80 of stage 64. Accordingly, the third binary digit is a One.

The third most significant Gray digit, a Zero, does not serve to energize the relay 74, and, therefore, the voltage of source 94, traced through stages 62 and 64 to contacts 74f and 74c is applied to transfer contact 74b and delivered to relay 76 at contacts 76f and 76c. Moreover, source voltage is developed across resistor 82, and the next binary digit is a One. Relay 76, energized by the voltage of the first Gray digit, connects the voltage of source 94 from the contact 76c to transfer contact 76a. No voltage is applied across resistor 84 and consequently, the first binary digit is a Zero.

Thus, the decoder of FIG. 5 has converted the Gray code number 0101 to the binary number 0110, which also corresponds to the decimal number 6, the assumed depth of the monitored liquids. In addition, current through the resistors 80 and 82 develops at the indicator 26 an analog indication of depth.

The complement of the binary depth indication corresponds to the distance between the surface of the monitored liquid and the top of the tank. A complement signal, which can be obtained in simple fashion from the output of the decoder 24, is thus useful in fuel tanks and the like which are filled with the combination of a lower water layer and an upper layer of non-conducting fluid.

While I ordinarily prefer to use Gray coding as described above, there may be some cases in which a standard binary arrangement will be at least as suitable. In such a configuration, there might be at each level a sensor in each stack whose output is a binary One for that level. A system of this type is subject to substantial error in the case of ambiguity at the surface of the liquid, e.g., where the sensors at a level do not all have exactly the same sensing level. However, since all the required information is available from the sensors at the liquid level, such a system might be constructed, with suitable switching circuitry, to eliminate error due to failure of sensors below that level. The Gray system (or any other similar code) requires operability of all sensors up to the liquid level.

Referring now to FIG. 6, it has been found that, when the liquid level is below a sensor 30 not having the coupling loop 48, a voltage may nevertheless appear across the secondary winding 40 when excitation current is applied to the primary winding 38. This output voltage is induced by two modes of leakage of the magnetic field from the driving core 32 into the pick-up core 34. The alternating excitation current applied to the primary winding 38 generates a magnetic loop 98 which extends directly to the core 34, as indicated by the arrows. In the latter core, the direction of this component is counter-clockwise, as viewed from above, for an instantaneous current I in the indicated direction.

In addition, there is a second magnetic loop 100 in the cores 32 and 34, resulting from the fact that the pick-up core 34 appears as a shunt path for the main field in the regions of the core 32 remote from the winding 38. In the core 34 the loop 100 takes the clockwise direction. Thus, the fields in the loops 98 and 100 induce oppositely phased voltages in the windings which they happen to link, in particular, the winding 40.

The voltage induced when a sensor is immersed may be adjusted by means of a non-conducting sleeve (not shown) extending through the interior of the sensor. The sleeve affects the cross sectional area of the interior and thus determines the resistance of the path therethrough. Since the magnitude of the coupling current depends on this resistance, the output voltage can be suitably adjusted by choosing a sleeve having the proper thickness.

The unwanted output voltage induced by the magnetic leakage fluxes is readily eliminated according to the present invention when the windings 38 and 40 of the sensor 30, FIGURE 6, are wound on only portions of the cores 32 and 34 respectively. It will be apparent that there is a position for the winding 40 along the circumference of the core 34 at which the voltages induced by leakage flux cancel. It is preferable to locate the winding 40 at this point so as to maintain zero voltage in the absence of immersion of the sensor in a conductive fluid. This can readily be accomplished during fabrication by rotating the core 34 and winding 40 with respect to the winding 38 until the output voltage is zero. The sensor is then encapsulated with the windings so positioned.

Although the cores 32 and 43 of the digital sensors have been described as axially spaced apart, other arrangements may also be used. For example, the two cores may be arranged concentrically. With this "pancake" arrangement, the vertical dimension of the sensor is reduced to a minimum. The sensors may, of course, be arranged in the array according to the standard binary code, but this requires twice as many sensors, there being more than one sensor at most fluid levels.

The approximate accuracy of the depth indication developed in the array 10 and, accordingly, a check on the state of repair of the sensors, may be obtained by using a conventional meter to monitor the current delivered by the oscillator 12 to the array. When a sensor is immersed, it draws more excitation current through its primary winding than when not immersed. Thus, as more sensors are immersed, the current drawn from the oscillator 12 increases.

It should be noted that when the coupling loops 48 (FIG. 2) are used, each of the sensors 30 above the liquid level develops an output voltage, although this voltage is substantially less than the output voltage of an immersed sensor. Where the number of sensors in a stack is not too great, the difference between these two levels is sufficient to enable voltage quantizing circuits to determine whether an even or odd number of sensors in the stack have been immersed, even though no special precautions are taken.

Referring again to FIG. 4, another method of checking the approximate accuracy of the operation of the array 10 includes the provision of checking sensors 106, 108 and 110 disposed at several depth intervals in the tank 52. The checking sensors may be excited by having their primary windings connected in series with the primary windings of the sensors 30 or, for increased reliability, they may be excited separately.

Although the measuring system specifically described incorporates the sensor of FIG. 2, other suitable devices may be used. In general, the sensing device should provide a signal having different, discrete values of frequency, phase or amplitude when immersed in fluid and otherwise.

For example, each sensor might comprise a capacitor whose capacitance is affected by the presence of a liquid at its levels. Each pair of vertically adjacent capacitors are connected in a bridge-type circuit unbalanced in one direction when both capacitances are equal, i.e., the liquid level is either below or above both capacitors. The bridge is unbalanced in the other direction, for a different phase of output voltage, when the liquid partially or wholly immerses just one of the capacitors. Sensors of this type are especially suitable for use with non-conductive liquids.

In summary, I have described improved digital apparatus for measuring the depths of fluids, particularly liquids. The system incorporates accurate, substantially trouble-free sensors that are relatively inexpensive to produce and are more resistant to deterioration by fluids or debris than prior sensors. The sensors specifically illustrated are suitable for use in conductive fluids and are readily adapted for use in non-conductive fluids. They are readily interconnected to provide a digital signal indicating the depth of fluid, and they are substantially unaffected by a film of fluid remaining after the level has receded. An array of such sensors, exposed to the fluid, is excited with an alternating current, and the output from the array is easily decoded to provide either an analog output signal or a binary coded signal, or both.

The system is particularly adapted to use on ships, since it may be installed in inaccessible places, and it provides a coherent depth indication even when the vessel is subjected to severe rolling and pitching, a feature due in large part to the use of a Gray coded system. Furthermore, by arranging the sensors according to the Gray code, we have reduced the number of sensors to a minimum without a significant loss of accuracy or reliability. Another advantage results from the fact that the system is unaffected by the pressure within the tank. Thus, it can be used in such locations as ballast tanks, often subject to extremely high internal pressures. In cases where volume rather than depth is the condition to be monitored, the indicator 26 may be calibrated directly in terms of this quantity. Where volume is not a linear function of depth, the sensors may be irregularly spaced to provide an output signal linearly related to volume.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. Fluid-depth sensing apparatus comprising, in combination, a plurality of sensors logically ordered in an array exposed to a fluid, each of said sensors having a sensing level, each sensor having a first pair of terminals and adapted to develop when immersed in said fluid below said sensing level a voltage therebetween having a characteristic substantially different from the voltage developed when the fluid level is below said sensing level, said sensors being arranged in said array so that additional sensing levels are immersed when the level of said fluid rises and being connected schematically in stacks with said first pairs of terminals in each stack being connected in series and adjacent sensors in each stack being connected so that said corresponding voltages thereof have opposite polarity.

2. The combination defined in claim 1 in which said sensors are arranged as a function of fluid-depth according to a digital code so that said array develops a digital output signal indicating the level of said fluid, each stack of sensors developing a digit of said signal.

3. The combination defined in claim 1 in which each of said sensors comprises a primary winding wound on a first magnetic core and a secondary winding wound on a second magnetic core, means connecting said primary winding to a source of alternating current, said cores being disposed so that when immersed in said fluid, current generated in said fluid by said alternating current develops a voltage across said secondary winding.

4. Apparatus for sensing the presence or absence of a fluid at a plurality of discretely spaced sensing levels, said apparatus comprising, in combination, a plurality of sensors logically ordered in an array exposed to said fluid, each sensor having a first pair of terminals and being adapted to develop therebetween when said fluid is above one of said sensing levels a signal substantially different from the signal developed when the fluid is below said sensing level, said array having pairs of output terminals, said sensors being disposed at different depths and connected schematically in stacks, said first terminals in each stack being connected in series between a pair of said output terminals, said sensors being so constructed and connected that adjacent sensors in each stack develop when said fluid is above their sensing levels voltages having substantially equal amplitude and opposite polarity, said sensors being ordered in said array at the various sensing levels so that the voltages developed across said output terminals identify the highest sensing level immersed by said fluid.

5. The combination defined in claim 4 including a source connected to energize said sensors and indicating means connected to said output terminals, said indicating means being responsive to said voltages to indicate the depth of said fluid.

6. Fluid depth measuring apparatus comprising, in combination, a plurality of sensors ordered in an array, each sensor comprising first and second toroidal magnetic cores, a primary winding on said first core and a secondary winding on said second core, a source connected to excite said primary windings with alternating current, said cores of each sensor being so disposed with respect to each other, that when they are immersed in a conductive fluid, current generated in said fluid by said alternating current develops a voltage across said secondary winding, said sensors being disposed in said array with a single sensor at each fluid level to be sensed, said sensors being schematically grouped in stacks, the sensors in each stack being interconnected in a circuit which sums the voltages induced in said secondary windings, the windings of said sensors in each stack being arranged so the voltages developed by the sensors in each pair thereof have opposite polarity when immersed.

7. The combination defined in claim 6 including an insulator disposed between the cores of each sensor, said insulator constraining the current in said fluid generated by said primary winding to pass substantially entirely through said second core.

8. Fluid depth measuring apparatus comprising, in combination, a plurality of sensors ordered in an array, each sensor comprising first and second toroidal magnetic cores, a primary winding on said first core and a secondary winding on said second core, a source connected to excite said primary windings with an alternating current, a conductor threading both cores and exposed to said fluid, said conductor having a temperature-dependent resistance characteristic, said sensors being disposed in said array with one sensor at each level of fluid to be sensed, said sensors being schematically grouped in stacks with the secondary windings of each stack being interconnected in such manner as to sum their voltages, the windings of said sensors in each stack being so arranged that the voltages developed by the sensors in each pair thereof have opposite polarity.

9. The combination defined in claim 8 in which a portion of said conductor is a thermistor, the resistance of said thermistor decreasing when the temperature of said thermistor decreases.

10. Apparatus for sensing discrete levels of a conductive fluid, said apparatus comprising, in combination, a plurality of digital sensors having first and second toroidal magnetic cores, a primary winding on each of said first cores and a secondary winding on each of said second cores, said cores in each sensor being coaxially disposed and axially spaced apart, and electrical insulator filling the space between the cores of said sensors, said sensors being schematically grouped in stacks with the secondary windings in each stack being connected in series between a pair of output terminals and with secondary windings in each pair thereof having opposite winding directions, a source connected to excite said primary windings with an alternating current, said sensors being arranged according to the Gray code with only one sensor at each of said levels whereby the voltages developed across said output terminals compose a binary Gray signal indicating the highest of said levels that is immersed in said fluid, each stack developing one digit of said signal, and means connected to said output terminals to indicate the depth of said fluid.

11. The combination defined in claim 10 in which said indicating means includes a decoder to convert the binary Gray signal to an analog signal, and a driver connected between said decoder and said sensors.

12. The combination defined in claim 11 in which said driver includes a filter, an amplifier and a rectifier connected to each of said output terminals.

13. The combination defined in claim 10 in which said indicating means includes a decoder to convert the binary Gray signal to a conventional binary signal, and a driver connected between said decoder and said sensors.

14. A fluid depth measuring instrument comprising a plurality of sensors schematically arranged in a plurality of stacks thereof, each of said stacks having a plurality of alternately disposed even and odd sensing levels, each of said stacks being arranged to provide a first output voltage for each fluid level above an odd sensing level and below the next higher sensing level and a second output voltage materially different from said first voltage for each fluid level above an even level and below the next higher odd level, a first one of said stacks having a first quantity of sensing levels and a second stack having a second quantity of sensing levels substantially half of said first quantity and disposed at levels between alternate pairs of sensing levels of said first stack, and output means responsive to the output voltages of said stacks.

15. A fluid depth measuring instrument comprising a plurality of sensors schematically arranged in a plurality of stacks thereof, each of said stacks having a plurality of alternately disposed even and odd sensing levels, each of said stacks being arranged to provide a first output voltage for each fluid level above an odd sensing level and below the next higher even level and a second output voltage materially different from said first voltage for each fluid level above an even sensing level and below the next higher odd level, the sensing levels of said stacks being arranged according to a binary code in which only one digit changes for each succeeding number, with a first stack providing substantially one-half the sensing levels of said instrument, a second stack providing substantially one-fourth the sensing levels of said instrument, and each successive stack providing substantially $$\frac{1}{2^{n-1}}$$

times the number of sensing levels in said first stack where $n$ is the numerical designation of the stack.

16. Fluid-depth sensing apparatus comprising, in combination, a plurality of sensors logically ordered in an array according to fluid depth, each sensor comprising first and second magnetic circuits, a source connected with each of said first magnetic circuits to induce an alternating magnetic flux therein, said magnetic circuits of each sensor being so disposed with respect to each other that when the sensor is immersed in a conductive fluid, current generated in said fluid in response to said alternating flux of said first circuit induces an alternating flux in said second circuit of the sensor, said sensors being grouped in stacks with the sensors in each stack being interconnected in a summing circuit that selectively sums the fluxes induced in said second magnetic circuits.

17. A fluid depth measuring instrument comprising a plurality of sensors schematically arranged in a plurality of stacks thereof, each of said stacks having a plurality of alternately disposed even and odd sensing levels, at least one of said stacks having a plurality of pairs of even and odd sensing levels, each of said stacks being arranged to provide a first output voltage for each fluid level above an odd sensing level and below the next higher even level and a second output voltage materially different from said first voltage for each fluid level above an even sensing level and below the next higher odd level, and output means responsive to the output voltages of said stacks, said stacks having different sensing levels, said sensing levels being arranged so that after the level of said fluid passes a sensing level in any given stack it passes a sensing level in at least one other stack before passing another sensing level in the given stack, and each combination of odd and even sensing levels immediately below the surface of said fluid occurs only once over the range of fluid depth sensed by said instrument.

18. Fluid-depth sensing apparatus comprising, in combination, a plurality of sensors logically ordered in an array exposed to a fluid, each of said sensors having a sensing level, each sensor having a first pair of terminals and being constructed to develop when immersed in said fluid below said sensing level an electrical signal therebetween having a characteristic substantially different from the signal developed when the fluid level is below said sensing level, said sensors being arranged in said array so that additional sensing levels are immersed when the level of said fluid rises and being connected schematically in stacks with said first pairs of terminals in each stack being connected in series so that the sum of said signals appears across the stack, said sensors in each stack being connected so that each pair of sensors develops a substantially zero net signal when both sensors in the pair are above or below the level of said fluid, and output means responsive to said signal sums.

19. Fluid-depth sensing apparatus comprising, in combination, a plurality of sensors logically ordered in an array for exposure to a fluid, each sensor having a pair of terminals and at least a portion that is thermally sensitive and being adapted to develop between said pair of terminals a voltage having a characteristic that changes according to the temperature of the thermally-sensitive portion thereof, said sensors being arranged in said array so that the thermally-sensitive portions of additional sensors are immersed when the fluid rises and being connected schematically in stacks with said pairs of terminals of the sensors in each stack being connected in a series circuit and with vertically-adjacent sensors in each stack being connected so that corresponding voltages thereof have opposite polarity.

20. The apparatus defined in claim 19 including means for heating said thermally-sensitive portions of said sensors, thereby to provide a substantial temperature differential between said thermally-sensitive portions below and above the fluid.

References Cited in the file of this patent
UNITED STATES PATENTS

| | | |
|---|---|---|
| 2,279,043 | Harrington | Apr. 7, 1942 |
| 2,542,057 | Relis | Feb. 20, 1951 |
| 2,645,126 | Hornfeck | July 14, 1953 |
| 2,859,420 | Schmidt | Nov. 4, 1958 |
| 2,930,009 | Cogley et al. | Mar. 22, 1960 |
| 2,975,384 | Geiser | Mar. 14, 1961 |
| 2,996,915 | Greenwood et al. | Aug. 22, 1961 |
| 3,010,320 | Sollecito | Nov. 28, 1961 |